W. A. HANCOCK.
GARDEN SEED PLANTER.
APPLICATION FILED FEB. 25, 1910.
991,978.
Patented May 9, 1911.
3 SHEETS—SHEET 3.
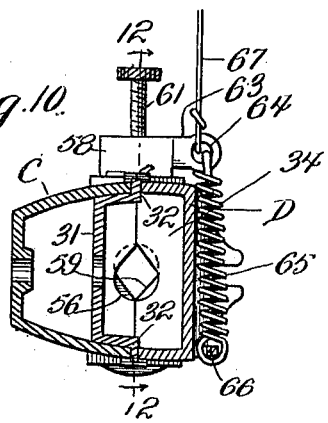
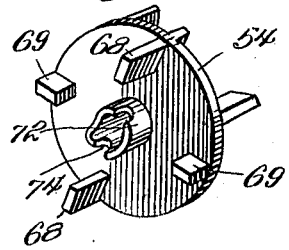
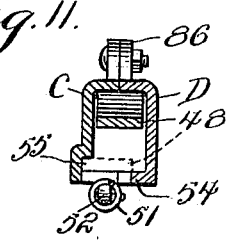
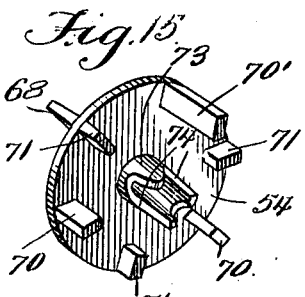
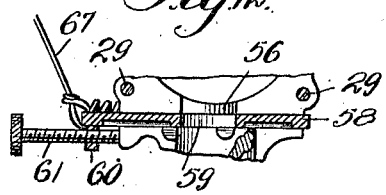
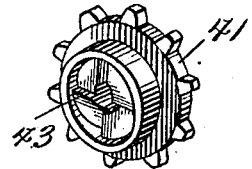
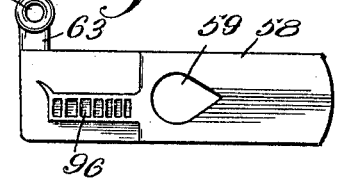
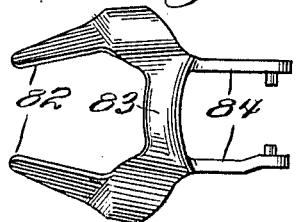
Witnesses
J. L. Wright
Wm Bagger
Inventor
Willard A. Hancock
By Victor J. Evans
Attorney
THE NORRIS PETERS CO., WASHINGTON, D. C.

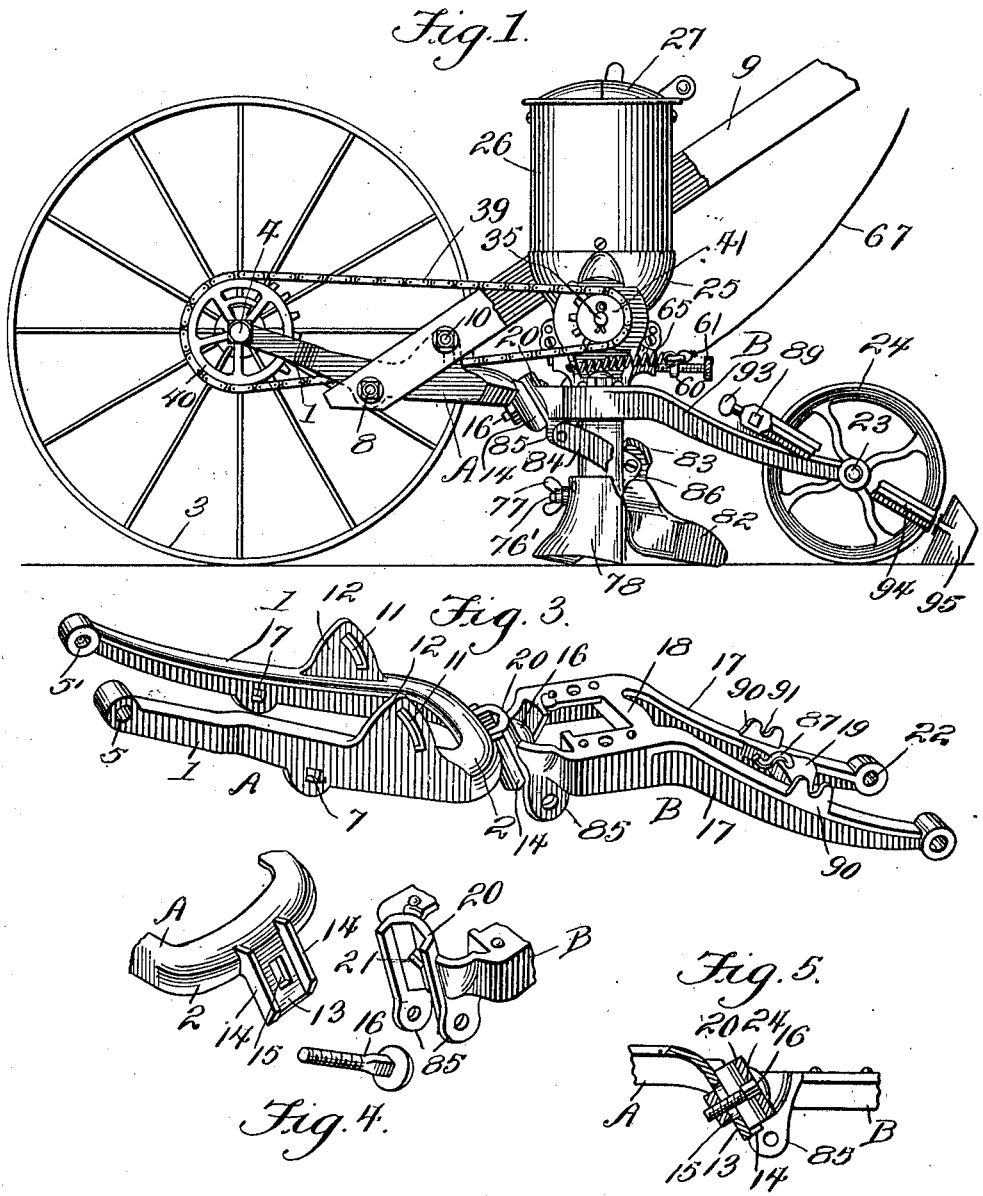

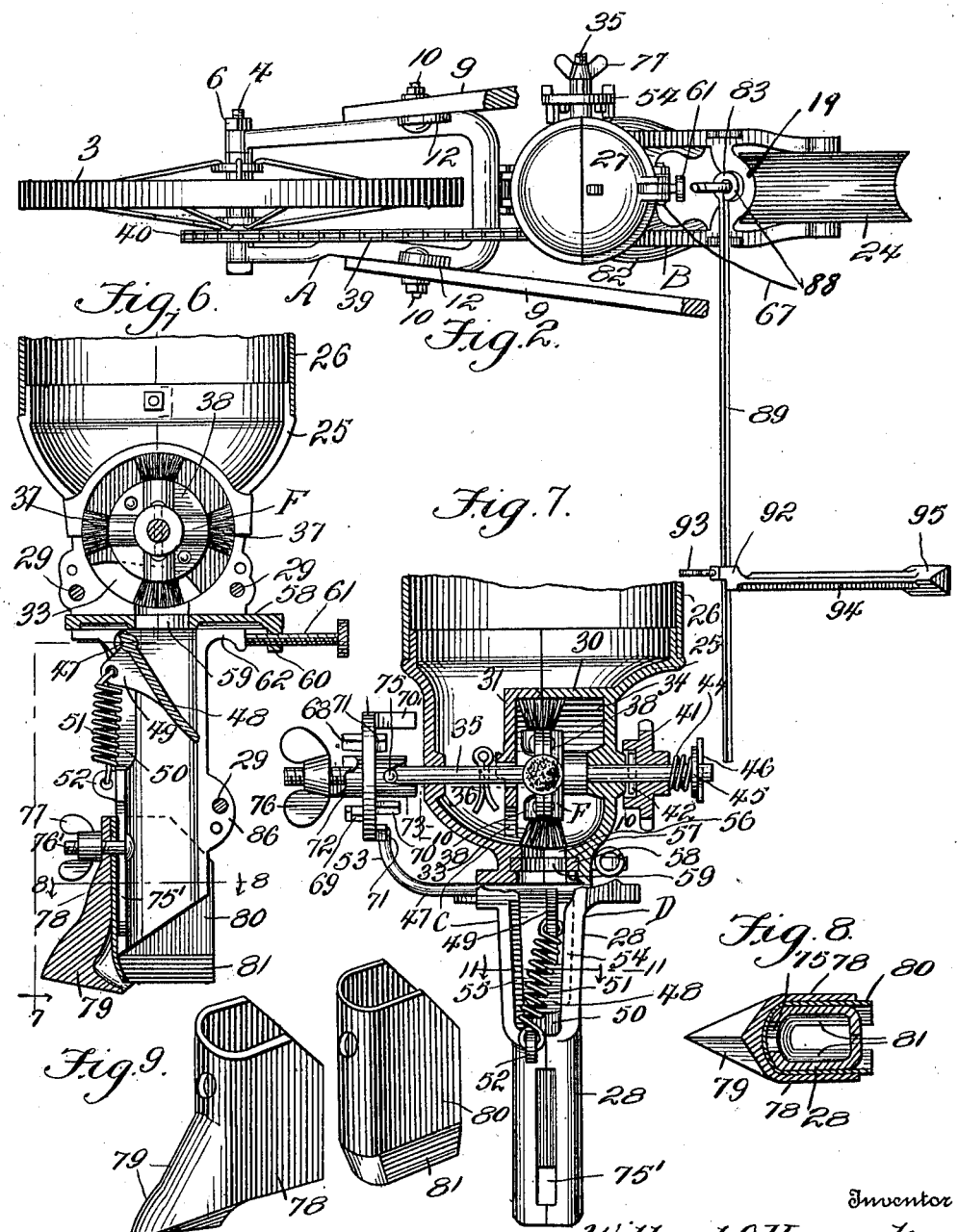

UNITED STATES PATENT OFFICE.

WILLARD A. HANCOCK, OF MONTROSE, IOWA.

GARDEN-SEED PLANTER.

991,978.     Specification of Letters Patent.     Patented May 9, 1911.

Application filed February 25, 1910. Serial No. 545,937.

*To all whom it may concern:*

Be it known that I, WILLARD A. HANCOCK, a citizen of the United States of America, residing at Montrose, in the county of Lee and State of Iowa, have invented new and useful Improvements in Garden-Seed Planters, of which the following is a specification.

This invention relates to an improved garden tool comprising a seed planter adapted to be propelled by hand.

One object of the present invention is to provide a simple and improved frame construction comprising a front frame and a rear frame detachably connected therewith, the front frame being equipped with a supporting wheel and the rear frame being adapted to support the seed planting mechanism.

A further object of the invention is to provide simple means by which the placing of seed in hills may be easily and quickly regulated and adjusted by the shifting or adjustment of a single part.

A further object of the invention is to provide simple and efficient means for changing the seed-planting mechanism to plant the seed in hills or in drills, as may be desired.

A further object of the invention is to provide improved means whereby the seed as it is planted will be directed toward the middle of the furrow, thus causing the plants to sprout in narrow rows which may be more easily and effectively cultivated than when the rows are wide and irregular.

A further object of the invention is to provide simple and improved means for feeding the seed so as to give a continuous flow by means of independent agitators which are constructed in such a manner as not to injure the seed.

A further object of the invention is to provide means whereby one of the agitators which consists of a brush is protected from unnecessary wear, and whereby the seed will be gently force-fed through the seed opening.

A further object of the invention is to simplify and improve the construction of the seed dropping valve and the operation thereof, whereby said valve may be adjusted for drilling the seed in a continuous row or for dropping it in hills.

Further objects of the invention are to simplify and improve the general construction and operation of a device of the character outlined above.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the invention may be resorted to when desired.

In the drawings,—Figure 1 is a side elevation of a garden seed planter constructed in accordance with the invention. Fig. 2 is a top plan view of the same. Fig. 3 is a perspective view of the frame of the device detached. Fig. 4 is a perspective view, showing the rear end of the front frame and the front end of the rear frame, separated, together with the connecting bolt detached. Fig. 5 is a sectional detail view looking in the direction of the meeting ends of the front and rear frames, showing the same connected. Fig. 6 is a vertical sectional view taken longitudinally through the seed box, the seed tube and related parts. Fig. 7 is a transverse sectional view, partly in elevation, on the line 7—7 in Fig. 6. Fig. 8 is a horizontal sectional detail view taken on the line 8—8 in Fig. 6. Fig. 9 is a perspective view, showing the furrow opening shoe detached from the seed tube, together with the inner shoe or guide member, the latter being shown detached. Fig. 10 is a horizontal sectional view taken through the seed box, the operating mechanism having been removed. Fig. 11 is a sectional detail view taken on the line 11—11 in Fig. 7. Fig. 12 is a vertical sectional detail view taken on the line 12—12 in Fig. 10. Fig. 13 is a plan view of the feed regulating index plate detached. Fig. 14 is a perspective detail view, showing one side of the valve actuating tappet wheel detached. Fig. 15 is a perspective view, showing the opposite side of said tappet wheel. Fig. 16 is a perspective detail view of the combined sprocket wheel and clutch. Fig. 17 is a detail plan view of the covering device.

Corresponding parts in the several figures are denoted by like characters of reference.

The frame of the improved machine includes the front or wheel-carrying member A and the rear or seed box carrying member B. The front frame A comprises the side members 1, 1 which are connected together at their rear ends by a cross piece 2 so as to form a fork for the accommodation of the carrying wheel 3 which is mounted for rotation upon a bolt or axle 4 extending through the hub of said wheel and through apertures 5 and 5′ in the side members of the frame, one of said apertures shown in Fig. 3 at 5′ being threaded for the reception of the threaded end of the bolt, which latter is held against rotation by means of a lock nut 6, see Fig. 2. The side members of the frame are provided with apertures 7 for the passage of pins or pivotal members 8 upon which the handles 9, which are used for propelling the machine, are mounted; said handles being secured at various adjustments by fastening members, such as bolts 10, extending through the handles and through arcuate slots 11 in lugs 12 upon the upper sides of the side bars of the frame.

The cross bar 2 at the rear end of the frame member A is provided with a downwardly and rearwardly inclined lug 13 provided at the sides thereof with ribs or flanges 14, said lug being also provided with a longitudinal slot 15 intermediate said flanges for the passage of a fastening member, such as a bolt 16, whereby the front frame member A is connected with the rear frame member B. The latter is composed of side members 17 connected intermediate their ends by cross pieces 18 and 19, the former of which is disposed near the front end and the latter near the rear end of the frame member. Said side members 17 are also connected adjacent to their front ends by a downwardly and rearwardly inclined connecting piece 20 adapted to fit between the ribs or flanges 14 of the lug 13 upon the front frame member and having an aperture 21 for the passage of the bolt 16, whereby the front and rear frame members are connected. The side members 17 of the frame member B are provided at their rear ends with apertures 22 for the passage of a pin or bolt 23 upon which the covering wheel 24 is supported for rotation; it being observed that the cross piece 19 is shaped to constitute a scraper adapted to engage the concaved rim of the covering wheel for the purpose of freeing the latter from dirt which may adhere thereto when the soil is damp and sticky.

The forward end of the frame member B is suitably shaped to form a seat for the base 25 of the seed hopper or receptacle 26; the latter which is preferably constructed of sheet metal is provided with a hingedly supported lid or cover 27, and it may be secured in any suitable manner upon the hopper base, which latter is preferably constructed of cast or malleable iron. The part of the device, which, for convenience is designated as the hopper base, includes the seed tube 28, said hopper base and seed tube being longitudinally and vertically divided into two separate pieces or castings C and D which when assembled may be securely connected together by fastening members such as bolts or rivets 29, best seen in Fig. 6. The member D of the hopper base is provided with an interior flange 30 of curved or arcuate form, said flange combining with the walls of the member D and with a correspondingly flanged plate 31 to form a chamber of approximately cylindrical form in which a seed-expelling brush, to be hereinafter more fully referred to, is supported for rotation. The flanged plate 31, which is clearly seen in Figs. 7 and 10 of the drawings, is provided, as best seen in Fig. 10, with lugs 32 that are gripped between the members C and D, the meeting edges of which are suitably recessed to accommodate said lugs. In this simple manner the parts may be conveniently assembled, and when assembled they combine to constitute a seed chamber of the desired shape. The partition plate 31 is provided with an aperture 33 (see Fig. 6) through which seed may pass from the space at one side of said plate which communicates with the lower end of the hopper into the approximately cylindrical chamber 34 bounded by said plate, by the flange 30 and by the walls of the member D.

An agitator shaft 35 is supported for rotation in the side walls of the members C and D, the plate 31 being provided with an aperture for the passage of said shaft. The latter carries intermediate the wall of the member C and the partition plate 31 an agitator 36 which may consist of a cotter pin of suitable dimensions extending diametrically through the shaft. The shaft 35 carries within the chamber 34 a rotary brush F composed of tufts 37 of bristles or any suitable material which are firmly secured between a pair of suitable clamping plates 38, the latter being provided with grooves or recesses for the accommodation of the bristles.

The shaft 35 is driven by means of a chain or link belt 39 which connects a sprocket wheel 40 upon the hub of the transporting wheel 3 with a sprocket wheel 41 which is mounted loosely upon the shaft 35 with which it is connected for rotation by means of a pin 42 engaging ratchets 43 upon the adjacent face of the sprocket wheel 41, the latter being held resiliently in engagement with the pin 32 by means of a spring 44 which is coiled upon the shaft between the sprocket wheel 41 and a stop member, such as a washer 45, held by a cotter pin 46. By this construction when the machine moves in a forward direction, the shaft 35 will be rotated; when the machine is moved in a rearward direction the ratchet or clutch face 43 of the sprocket wheel 41 will recede from the pin 42 against the tension of the spring 44, thus permitting the sprocket wheel to rotate idly upon the shaft 35.

The downwardly extending portions of the members C and D which combine to constitute the seed tube are provided with bearings for a shaft 47 carrying a valve 48 which extends rearwardly and downwardly into the seed tube, being adapted to abut against the rear wall of the latter and occupying, when thus abutting, the entire area between the front, rear and side walls of the seed tube. The valve member is provided with a lug or arm 49 extending forwardly through a slot 50 in the front wall of the seed tube, said arm or lug being connected by a coiled spring 51 with a lug 52 extending forwardly from the seed tube, and disposed adjacent to one side edge of the latter, thus causing the spring 52 to occupy a position extending diagonally across the slot 50, as has been very clearly indicated in Fig. 7 of the drawings. The shaft 47 is extended to one side of the feed tube and is bent to form an arm 53 lying in the path of tappets extending from a spacing wheel 54, the construction of which will be hereinafter more fully described. It will be readily seen that the valve 48 under the tension of the spring 51 occupies an obstructing position in the seed tube, as shown in Fig. 6; when the shaft 47 is oscillated by the means provided for the purpose, the valve is capable of swinging open against the tension of the spring 51. The seed tube is provided adjacent to one side of the slot 50 with a flange 54 (see Fig. 11) which obstructs the movement of the valve member in a rearward direction, and adjacent to the opposite side of the slot 50 is formed a recess 55. When it shall be desired to dispense with the valve member 48 in order to plant the seed in drills, it is not necessary to detach said valve member, but merely to swing it back against the tension of the spring 51 until it is intercepted by the flange 54, when, by slightly moving the valve-supporting shaft 47 longitudinally in its bearings, the valve may be placed in engagement with the recess 55, thereby preventing the valve from moving or swinging in a rearward direction, and at the same time obstructing the slot 50.

The valve will be readily held in this position owing to the diagonal disposition of the spring 51 which will exert a strain in the direction of the lug 52, diagonally across the slot 50, thus holding the valve securely in the position to which it has been adjusted.

The bottom of the hopper base is provided with a pear-shaped seed opening or aperture 56 which is made of suitable dimensions to admit of the passage of the largest seeds that it may be desired to plant. The side members C and D of the hopper base are provided in their proximate faces with grooves 57 for the accommodation of the seed slide and index plate 58, best seen in Fig. 13, which is provided with a corresponding pear-shaped opening 59, the point of which is opposed to the point of the opening 56 in the bottom of the hopper base. The seed slide or plate 58 is provided adjacent to its rear end with a downwardly extending lug 60 which is threaded for the passage of a set screw 61, the point of which is adapted to bear against the seed tube which may be provided with a suitable projection 62 to be engaged by the screw. The seed plate is also provided with a laterally extending arm 63 having an aperture 64 for the reception of one end of a coiled spring 65, the opposite end of which is connected with a lug 66 extending from the hopper base, the tension of said spring being exerted to force the seed plate in a forward direction, and the movement in a forward direction being limited by the set screw 61. It will be readily seen that by proper adjustment of the plate, the opening 56 may be more or less obstructed by the seed plate having the corresponding aperture 59, the parts combining to form an opening of the requisite size to admit of the passage of seeds of various kinds. By bringing the small ends of the openings 56 and 59 in juxtaposition, a very small aperture admitting of the passage of the smallest seeds only may be formed, while by proper adjustment of the plate the size of the aperture may be varied, as may be desired. A flexible element, such as a cord 67, is suitably connected with the arm 63 of the seed plate, the other end of said cord being extended within convenient reach of the operator, who by pulling upon said cord may move the slide against the tension of the spring until the opening 56 is entirely obstructed by the solid portion of said slide, thus completely cutting off the passage of seeds.

The spacing disk 54, which has been particularly illustrated in Figs. 14 and 15, is provided with a hub or sleeve extending in opposite directions from the faces of the disk which may thereby be adjusted upon the shaft 35. One face of the disk, as best seen in Fig. 14, is provided with four tappets arranged equidistantly adjacent to the rim or periphery of the disk, two of said tappets 68 being longer than the other two tappets 69, and the tappets of equal length being disposed at diametrically opposite sides of the disk. The opposite face of the disk, as seen in Fig. 15, is provided with six tappets, equidistantly arranged, two of said tappets, 70, being longer than the tappets 71 which are disposed in alternate order therewith. The sleeve or hub of the disk is provided at its projecting ends 72 and 73 with intersecting notches 74 adapted for engagement with a pin 75 extending transversely through the shaft 35 and with which the spacing disk may be held securely in engagement by means of a wing nut 76 which is in threaded engagement with the shaft. One of the tappet teeth which has been specially designated 70' is of a length somewhat exceeding that of its mates which are numbered 70. It will be understood that when the spacing disk is mounted in position for operation, the notches in the end of the sleeve or hub will limit the movement of the spacing disk in the direction of the arm 53 of the valve-carrying shaft 47. Thus, when the side of the disk having the four tappets 68, 68 and 69, 69 is thrown in the direction of the valve-carrying shaft, the spacing disk may be so mounted with relation to the arm 53 that the latter will be engaged only by the tappets 68, 68, thus causing the valve to be actuated twice during the rotation of the spacing disk. By shifting the position of the latter and moving it in the direction of the seed tube, the arm 53 will be engaged by each of the four tappets, thus causing the valve to be actuated four times during the rotation of the disk. By reversing the spacing disk end for end, it may be so supported that only the longest tappet tooth 70' will engage the arm 53, thus causing the valve to be actuated only a single time during the rotation of the disk. By rearrangement of the disk the arm 53 will be disposed in the path of the three tappets 70, 70 and 70', thus causing the valve to be actuated three times during the rotation of the disk, while by still further moving the spacing disk in the direction of the seed tube, the arm 53 may be disposed in the path of each of the tappets 70, 70, 70', 71, 71 and 71, thus causing the valve to be actuated six times during the rotation of the disk. Assuming then, that by a complete rotation of the spacing disk, seed will be delivered at intervals of twenty-four inches apart, it will be readily seen that by the various adjustments herein described, the mechanism may be set to actuate the valve and to deliver seed in hills at either four, six, eight, twelve or twenty-four inches apart, thus giving a wide range of adjustment with the use of but a single spacing wheel or member. The front wall of the seed tube is provided adjacent to its lower end with a vertical slot or aperture 75' for the passage of a fastening element, such as a bolt 76', having a wing nut 77, the same being used for securing in position the furrow-opening shoe 78, the construction of which will be best understood by reference to Fig. 9, from which it will appear that said shoe, the upper portion of which is U-shaped in horizontal section, has an earth-engaging nose 79, the underside of which is V-shaped in cross section so that the bottom of the furrow formed by said implement will be correspondingly V-shaped. In connection with the earth-engaging shoe 78, I use an inner U-shaped shoe 80 made of sheet metal, said inner shoe being provided adjacent to its lower edge with inturned flanges 81. The shoe 80, which exteriorly engages the seed tube, is fitted within the shoe 78, both of said members being secured by means of the bolt 76' which is vertically adjustable in the slot 75', thus enabling the depth of the furrow to be regulated. The function of the inner shoe 80 having the inturned flanges 81 is to direct the seed as it drops into the furrow toward the center or middle portion of the latter, where said seed will be planted in a narrow straight line, as will be readily understood. This is extremely important and desirable, especially in the case of small seeds, inasmuch as the plants when they have begun to sprout may be more thoroughly cultivated without injury than if the rows were wide and irregular. The U-shaped shoes will prevent the side members 28 from spreading, thus relieving the strain upon the connecting members 29 and reinforcing the construction.

A covering device is used which consists of a pair of suitably curved blades 82 which are connected together by a cross piece 83 and are provided with forwardly extending arms 84, which latter are disposed adjacent to opposite sides of the seed tube and are pivotally mounted upon a lug 85 depending from the frame member B. The downward movement of the covering blades 82 will be limited by the engagement of the cross piece 83 with a projection 86 upon the rear side of the seed tube, said projection being formed by the lugs formed upon the castings C and D for the passage of one of the connecting members 29. The covering blades are so constructed that they would serve to move back into the furrow the soil displaced by the shoe 78 in the formation of the furrow, thus covering the seed to the desired depth. Ridging of the soil will be prevented by the presence of the projection 86 lying in the path of the cross piece 83 which limits the downward movement of the covering blades, as described.

One of the cross pieces 19 of the frame member B is provided with a forwardly extending hook member 87 of the peculiar shape illustrated in Fig. 3, by reference to which it will be seen that said member virtually constitutes a double hook which extends from the cross bar 19 upwardly, forwardly, downwardly, forwardly and again upwardly, so as to be readily engaged by an eye 88 formed at one end of a marker bar 89 which, when adjusted upon said hook, will be held very securely against accidental displacement. The side members 17 of the frame member B are provided with upwardly extending lugs 90 having notches or recesses 91 to receive and retain the marker bar 89 when the machine is in operation. The marker bar carries an adjustable sleeve 92 held by means of a set screw 93 and equipped with an arm 94 carrying an earth-engaging marking implement 95 of suitable construction. It will be readily understood that the marker bar being pivotally connected with the hook member 87 may be swung over the frame and placed in engagement with the notched lug upon either side bar, thus changing the marker from one side of the machine to the other, according to the direction in which the machine is moved.

The operation of the seed planting mechanism will be readily understood.

When it is desired to drill the seed, the valve 48 is adjusted in engagment with the recess 55 where it is held by the tensile action of the spring 51, thus obstructing the slot or opening 50 in the seed tube and leaving the latter entirely unobstructed. The seed plate 58 is adjusted with reference to the kind and size of seed that is to be planted, it being understood that said seed plate is to be provided with indicating ribs, grooves or other marks, as seen in Fig. 13, at 96, and it being further understood that the names of various seeds may be placed upon the plate, in abbreviated form, if desired, so as to be readily visible. The desired adjustment of the seed plate having been effected by means of the set screw 61, the machine is now ready for operation. Slack in the driving chain 39 may be taken up by moving the frame member B rearwardly with reference to the frame member A, this being readily accomplished owing to the inclined position of the lug 13 upon which the connecting member 20 of the frame member B rides. Seed of the desired kind having been placed in the box or hopper, the machine is now propelled by means of the handles, the furrow-opening member having been vertically adjusted to properly regulate the depth of the furrow. The seed will be kept stirred and agitated by the agitator 36, which serves to project the seed through the aperture 33 in the partition plate 31 into the chamber 34, the bottom of which communicates through the apertures 56, 59 with the seed tube. The seed will be gently force-fed by the rotary brush member F through the aperture, passing through the seed tube to the furrow where it will be covered by the coverers 82.

While the machine is being used as a drill, the arm 53 of the valve-carrying shaft 47 is disposed out of the path of the tappets upon the spacing disk. Should it be desired to plant the seed in hills, the valve is released from engagement with the recess 55 so that its lower end will swing into engagement with the rear wall of the seed tube, which latter will now be obstructed by the valve. The spacing disk is now adjusted so as to cause the valve to be actuated the desired number of times during each rotation of the spacing disk for the purpose of regulating the distance between the hills. At the desired intervals the valve will be actuated, thus causing the charge of seed which has been permitted to accumulate in the valve chamber to drop simultaneously through the seed tube to the furrow, where it will be covered, as previously described. As before stated, the seed plate may be set or adjusted according to the kind and size of seed that is to be planted, and the position of the spacing disk may be readily changed to regulate the distance between the hills. The operation of the marker is obvious, it being understood, however, that its position is to be changed or reversed when the machine is turned at the end of each row.

As will be seen from the foregoing description, taken in connection with the drawings hereto annexed, my improved garden seed planting implement is extremely simple in construction, and it will be found to be thoroughly efficient for the purposes for which it is provided.

Having thus described the invention, what is claimed as new, is:—

1. In a device of the character described, a frame structure consisting of front and rear members having inclined opposed portions connected together for longitudinal and vertical adjustment, a wheel supported for rotation upon the front frame member, seed planting mechanism supported upon the rear frame member and including a shaft supported for rotation, a sprocket wheel upon said shaft, a sprocket wheel upon the hub of the carrying wheel, and a driving chain connecting said sprocket wheels, whereby slack in said chain may be taken up by relative adjustment of the frame members.

2. A hopper base consisting of two side members secured together, said hopper base being provided with a horizontal pear-shaped aperture and said members being provided with grooves in their opposing faces, in combination with a seed slide movably engaging the grooves, a spring actuating said slide in one direction, and a set screw engaging the slide and bearing against the seed tube to actuate the slide for adjustment in the opposite direction, said slide being provided with a pear-shaped aperture coöperating with the corresponding aperture in the hopper base to regulate the passage of seed.

3. A hopper base including a seed tube, the same being composed of two side members secured together, the hopper portion of one side member being provided with an arcuate approximately circular flange, in combination with a correspondingly flanged partition plate having lugs engaging recesses in the meeting edges of the side members.

4. A hopper base including a seed tube having a vertically slotted front wall, a valve-carrying shaft supported for oscillation in the side walls of the seed tube adjacent to the front wall and having a limited longitudinal movement, and a valve upon the shaft having an arm extending forwardly through the slot in the seed tube, the latter being provided with a flange adjacent to one edge of the slot and with a recess adjacent to the other edge in which recess the valve may be accommodated when moved to a slot-obstructing position.

5. A hopper base including a seed tube having a vertically slotted front wall, a valve-carrying shaft supported for oscillation in the side walls of the seed tube adjacent to the front wall and having a limited longitudinal movement, and a valve upon the shaft having an arm extending forwardly through the slot in the seed tube, the latter being provided with a flange adjacent to one edge of the slot and with a recess adjacent to the other edge in which recess the valve may be accommodated when moved to a slot-obstructing position; in combination with a spring extending diagonally across the slot in the seed tube and connecting the arm of the valve with a fixed point upon the seed tube.

6. A hopper base including a seed tube, a shaft supported for oscillation in the seed tube, a tube-obstructing valve carried by said shaft, and an actuating spring for said valve, said valve-carrying shaft being provided with a divergent arm; in combination with a shaft supported for rotation in the hopper base, seed-agitating devices upon said shaft, and a reversible spacing disk adjustably mounted upon the shaft and having on each side thereof a plurality of series of tappets adapted for engagement with the divergent arm of the valve-carrying shaft.

7. In a seed planter, a seed tube, seed dropping mechanism including a valve in the tube, an earth engaging shoe supported for vertical adjustment upon the tube and having a V-shaped underside, and an auxiliary member interposed between the shoe and the tube for the purpose of directing seed toward the middle of the furrow.

8. In a seed planter, a seed tube, seed dropping mechanism including a valve in said tube, an earth engaging shoe supported for vertical adjustment upon the tube and having a V-shaped underside, and an inner shoe interposed between the earth engaging shoe and the tube, said inner shoe being provided adjacent to its lower edge with inturned flanges, whereby seed passing through the tube will be directed toward the middle of the furrow.

In testimony whereof I affix my signature in presence of two witnesses.

WILLARD A. HANCOCK.

Witnesses:
FRANK SAWYER,
JACK OWEN.

---

Copies of this patent may be obtained for five cents each, by addressing the "Commissioner of Patents, Washington, D. C."